United States Patent [19]

Morera

[11] Patent Number: 5,303,416

[45] Date of Patent: Apr. 12, 1994

[54] METHOD AND APPARATUS FOR ADJUSTING PEAK AND VALLEY ACQUISITION RATES OF A SIGNAL RECEIVED BY A RADIO COMMUNICATION DEVICE

[75] Inventor: Daniel A. Morera, Boynton Beach, Fla.

[73] Assignee: Motorola, Inc., Schaumburg, Ill.

[21] Appl. No.: 6,599

[22] Filed: Jan. 21, 1993

[51] Int. Cl.$^5$ .......................... H04B 1/10; G08B 5/22
[52] U.S. Cl. ............................... 455/296; 340/825.44; 376/76
[58] Field of Search .............. 455/334, 337, 309, 296; 375/76, 99; 340/825.44, 825.48, 146.2; 307/351, 358, 359, 352; 328/151

[56] References Cited

U.S. PATENT DOCUMENTS

| | | | |
|---|---|---|---|
| 3,537,084 | 10/1970 | Behr | 360/51 |
| 3,719,934 | 3/1973 | Behr et al. | 360/41 |
| 3,736,582 | 5/1973 | Norris | 360/43 |
| 4,013,961 | 3/1977 | Colebourn h | 328/151 |
| 4,121,121 | 8/1978 | Gabeler | 328/151 |
| 4,631,737 | 12/1986 | Davis et al. | 307/351 |
| 4,866,261 | 9/1989 | Pace | 328/165 |
| 4,929,851 | 5/1990 | Pace | 307/359 |
| 5,003,196 | 3/1991 | Kawaguchi | 307/351 |
| 5,025,251 | 6/1991 | Mittel | 375/76 |

FOREIGN PATENT DOCUMENTS 8502962 7/1985 World Int. Prop. O. ............ 375/76

*Primary Examiner*—Jin F. Ng
*Assistant Examiner*—Mark D. Wisler
*Attorney, Agent, or Firm*—Daniel R. Collopy; Thomas G. Berry

[57] ABSTRACT

A radio communication device (100) for receiving a signal comprises tracking circuitry (115) for tracking the signal to acquire peak and valley values of the signal, a threshold detector (150) coupled to the tracking circuitry (115) for determining a center threshold of the signal, and an edge detector (180) coupled to the threshold detector (150) and the tracking circuitry (115) for determining a number of center transitions of the signal in a predetermined time period. The radio communication device (100) further comprises a rate controller (185) coupled to the edge detector (180) and the tracking circuitry (115) for receiving the number of center transitions and for adjusting an acquisition rate with which the peak and valley values are acquired in accordance with the number of center transitions.

19 Claims, 3 Drawing Sheets

METHOD AND APPARATUS FOR ADJUSTING PEAK AND VALLEY ACQUISITION RATES OF A SIGNAL RECEIVED BY A RADIO COMMUNICATION DEVICE

FIELD OF THE INVENTION

This invention relates in general to radio communication devices, and more specifically to a radio communication device which acquires highs and lows, i.e., peaks and valleys, of a received signal.

BACKGROUND OF THE INVENTION

Radio communication devices, such as pagers, typically receive and decode radio frequency (RF) signals to recover information contained therein. In many conventional radio communication devices, a received signal is first converted from the radio frequency at which it is received to baseband, subsequent to which digital data is recovered from the signal. The data is then processed by decoding circuitry, such as a microcomputer, which decodes the included information.

In order to recover the digital data from an incoming signal, the microcomputer generally directs tracking circuitry included within the radio communication device to track the incoming signal for a predetermined amount of time to acquire peak and valley values, i.e., high and low voltage values, of the signal. Once the incoming signal has stabilized and the peak and valley values have been acquired, they are stored and provided to a threshold detector for computation of a center threshold between the values. The threshold detector utilizes the peak and valley values and the center threshold to generate from the incoming signal a stream of digital data for provision to the microcomputer or other decoding circuitry.

Conventionally, the tracking circuitry is set at a predetermined acquisition rate which determines the response time in which changing peak and valley values can be acquired. This acquisition rate is usually set to a relatively slow rate such that small deviations in a desired signal, such as those caused by noise on the channel, do not cause the desired, stable values to fluctuate and thus cause errors in the data recovery process. However, a slow acquisition rate, although necessary for accurate data recovery, can sometimes cause problems when the radio communication device is in a noisy or fading environment.

When no signal is present on the channel, or when a very noisy signal is present, the peak and valley values present on the channel can fluctuate rapidly and may be very unstable. Additionally, the values present on the noisy channel may be well above or below the true peak and valley values of the desired signal. Because of the fairly slow acquisition rate, the tracking circuitry may be unable to track the peak and valley values of the noisy signals as quickly as they are fluctuating. Therefore, when the desired signal is received, the tracking circuitry may not be able to immediately acquire the stable values.

By way of example, when the fluctuating peak and valley values of a noisy signal drop to more stable values indicative of a desired signal, the tracking circuitry requires a response time, which depends upon the predetermined acquisition rate, to decrement or increment internal counters from the undesired values to the stable values of the desired signal. As a result, during the response time of the tracking circuitry, data included in a desired signal may be "missed" until the tracking circuitry has acquired the correct peak and valley values of the desired signal.

Thus, what is needed is a radio communication device having tracking circuitry which is able to rapidly acquire changing peak and valley values. Additionally, small deviations in the peak and valley values of a desired signal should not cause stored peak and valley values to fluctuate.

SUMMARY OF THE INVENTION

According to a first aspect of this invention, a method, in a radio communication device for receiving a signal, for tracking the signal to acquire peak and valley values of the signal comprises the steps of determining a center threshold of the signal and determining a number of center transitions of the signal within a predetermined time period. The method further comprises the steps of adjusting, in response to the determining step, an acquisition rate at which the peak and the valley values of the signal are acquired from a first acquisition rate to a second acquisition rate in accordance with the number of center transitions occurring in the predetermined time period.

According to a second aspect of this invention, a radio communication device for receiving a signal comprises tracking circuitry for tracking the signal to acquire peak and valley values of the signal, a threshold detector coupled to the tracking circuitry for determining a center threshold of the signal, and an edge detector coupled to the threshold detector and the tracking circuitry for determining a number of center transitions of the signal in a predetermined time period. The radio communication device further comprises a rate controller coupled to the edge detector and the tracking circuitry for receiving the number of center transitions and for adjusting an acquisition rate with which the peak and valley values are acquired in accordance with the number of center transitions.

DESCRIPTION OF A PREFERRED EMBODIMENT

Figure 1:
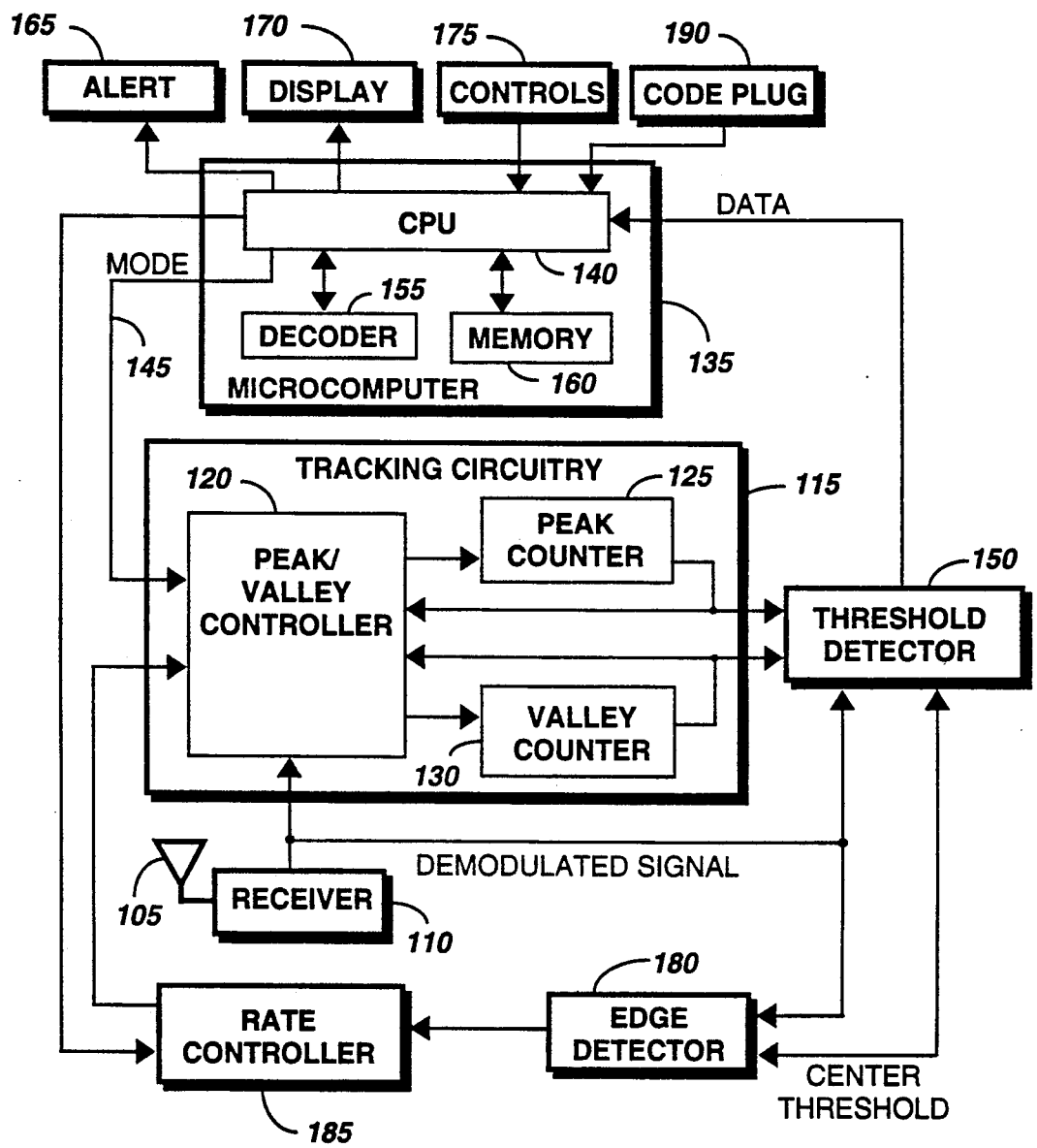
FIG. 1 is an electrical block diagram of a radio communication device in accordance with a preferred embodiment of the present invention.

With reference to FIG. 1, an electrical block diagram of a radio communication device 100 is depicted. In accordance with the preferred embodiment of the present invention, the radio communication device 100 comprises an antenna 105 for receiving a radio frequency (RF) signal and a receiver 110 coupled to the antenna 105 for demodulating the RF signal. The demodulated signal is thereafter provided to tracking circuitry 115, which processes the signal to acquire peaks and valleys, i.e., highs and lows, of the signal for subsequent use in generating digital data. The tracking circuitry preferably comprises a peak/valley controller 120 and peak and valley counters 125, 130 coupled to the peak/valley controller 120 for storing values corresponding to the signal peaks and valleys as directed by the peak/valley controller 120.

Further included in the radio communication device 100 is a processing unit for controlling the operation of the radio communication device 100. Preferably, the processing unit is a microcomputer 135, such as the MC68HC05 manufactured by Motorola, Inc. of Schaumburg, Ill., although it may be appreciated that the processing unit may be implemented through the use of hard-wired logic capable of performing the same operations.

The microcomputer 135 includes a central processing unit (CPU) 140, which controls the microcomputer 135 and, in accordance with the preferred embodiment of the present invention, provides control signals to the peak/valley controller 120 via a mode control line 145.

The CPU 140 is able to place the controller 120 in three different modes, usually referred to as "reset", "track", and "hold". When the peak/valley controller 120 is set in the track mode, the incoming demodulated signal is tracked to acquire the peaks and valleys of the signal. As the signal is tracked, the peak and valley counters 125, 130 are incremented and decremented to store values representing the signal levels, i.e., the peaks and valleys of the signal. The peak and valley values stored in the counters 125, 130 are provided to a threshold detector 150, which receives the demodulated signal as well.

Preferably, the threshold detector 150 generates from the peak and valley values a center threshold of the signal. In two-level signalling applications, signal levels of the demodulated signal which are above the center threshold are recognized as being digital one's, and signal levels which are below the center threshold are recognized as being digital zero's. In this manner, the threshold detector utilizes the peak and valley values and the demodulated signal to generate digital data, which is provided to the CPU 140.

The CPU 140 subsequently provides the data to a decoder 155, which is also internal to the microcomputer 135. The decoder 155 decodes the data to recover information, e.g., selective call messages, which is stored in a memory 160 coupled to the CPU 140. The CPU 140 may then provide an activation signal to an alert mechanism 165, such as a transducer, which, in response thereto, generates an audible alert to announce to a user that a selective call message has been received. The selective call message may be displayed to the user on a display device 170 either automatically or manually in response to user manipulation of controls 175, which are accessible from the exterior of the radio communication device 100.

Although operation of the peak/valley controller 120 in the track mode may continue indefinitely, the CPU 140 preferably places the peak/valley controller 120 in the hold mode once the digital data is determined to be received correctly. For example, in POCSAG (Post Office Code Standardization Advisory Group) signalling formats, the CPU 140 is able to determine that data has been received correctly when a code synchronization word has been completely recovered. Thereafter, the CPU 140 transmits a hold signal via the mode control line 145 to direct the peak/valley controller 120 to hold the current peak and valley values stored in the peak and valley counters 125, 130. As a result, peak and valley values which have been determined to be correct continue to be utilized by the threshold detector 150 for generation of the digital data. In this manner, noise spikes or other variations in the signal do not affect the data generation process.

After completion of the data decoding process, the peak/valley controller 120 is placed in the reset mode to reset the peak and valley values stored in the counters 125, 130, subsequent to which the peak/valley controller 120 is preferably again placed in the track mode to continue tracking the signal.

In most known paging systems, noise, rather than a desired signal, is received at various times by the radio communication device 100. For example, a paging transmitter may be turned off to save power or the radio communication device 100 may be located in a noisy environment in which the signal fades. Even when noise is received, the tracking circuitry 115 continues to track the received signal so that peaks and valleys of the desired signal, when received, may be acquired as soon as possible.

To reduce the time necessary for acquiring the peaks and valleys of the desired signal, the radio communication device 100 according to the present invention further includes an edge detector 180 for determining the number of center transitions of the demodulated signal occurring in a predetermined amount of time. This number is provided to a rate controller 185 coupled to the edge detector 180. The rate controller 185 preferably determines from the number of center transitions whether noise or a desired signal is present and adjusts the peak and valley acquisition rate of the peak/valley controller 120 in response to the determination.

In accordance with the preferred embodiment of the present invention, the CPU 140 is coupled to the rate controller 185. The rate controller 185 receives a value from the CPU 140 and determines therefrom the type of received signal, i.e., noise or desired signal. This is easily accomplished because a noisy signal typically fluctuates at a much greater rate than a transmitted signal. Therefore, the number of center transitions of a noisy signal is usually greater than the number of center transitions of a transmitted signal, such as the desired signal. The value provided to the rate controller 185 corresponds to a noise threshold value above which the number of center transitions is indicative of a noisy signal. The value may be stored in the microcomputer memory 160 or, alternatively, may be programmed into a programmable code memory 190 and retrieved by the CPU 140 for subsequent transfer to the rate controller 185.

In response to determining that the received signal is noisy, i.e., the number of center transitions exceeds the noise threshold value provided by the CPU 140, the rate controller 185 adjusts the acquisition rate of the peak/valley controller 120 such that the peaks and valleys of the signal may be tracked more quickly. In this manner, situations may be avoided in which the beginning of the desired signal is "missed" because the peaks and valleys of the desired signal are not acquired quickly enough. Once the rate controller 185 determines that the number of center transitions is below the noise threshold value, indicating that a desired signal, rather than noise, is present, the acquisition rate is adjusted to track the signal more slowly, preferably after expiration of a predetermined delay time in which the peaks and valleys have stabilized. When the signal is tracked more slowly, small variations in the peaks and valleys of the desired signal are conveniently prevented from affecting the peak and valley values stored in the peak and valley counters 125, 130, thereby decreasing the possibility of the threshold detector 150 erroneously generating data.

In conventional radio communication devices, no provision exists for adjusting the acquisition rate at which signal peaks and valleys are acquired. Typically, therefore, the acquisition rate is set to a relatively slow rate to ensure accurate generation and decoding of data. As a result, however, transitions from a noisy signal to a desired signal can be easily missed. This may be better understood by referring to FIGS. 2 and 3.

Figure 2:
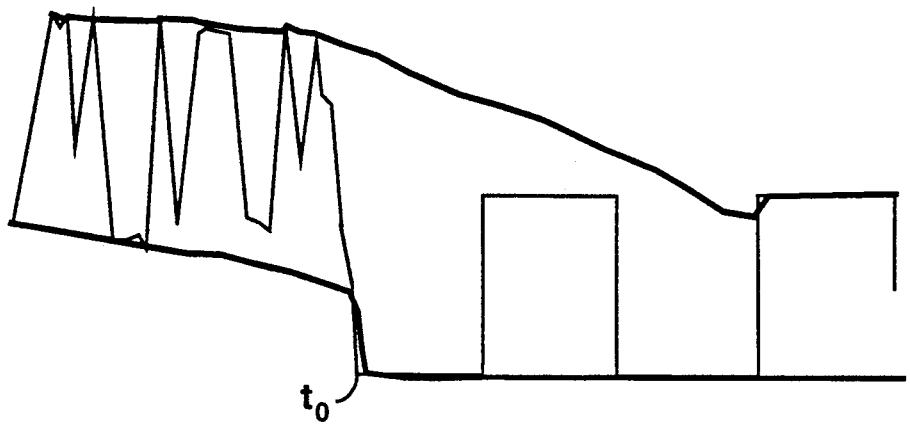
FIG. 2 is a signal diagram depicting the tracking of a received signal by a conventional radio communication device.

FIG. 2 is a signal diagram of the tracking of a demodulated signal in a conventional radio communication device. As shown, the tracking circuitry included within the conventional radio communication device tracks the noise at a very slow rate. Therefore, when the desired signal is received, at time $t_0$, the tracking circuitry is unable to acquire the peaks and valleys of the desired signal at the beginning of the signal at $t_0$. Information included in the signal is missed, as a result, until the peaks and valleys are acquired. By way of example, if, in a system utilizing the POCSAG signalling format, the code synchronization word, which is transmitted at the beginning of a frame of data, is not tracked by the tracking circuitry, the code synchronization word is not recognized by the radio communication device. This results in the radio communication device having to wait until transmission of a subsequent frame of data for reception of selective call messages.

Figure 3:
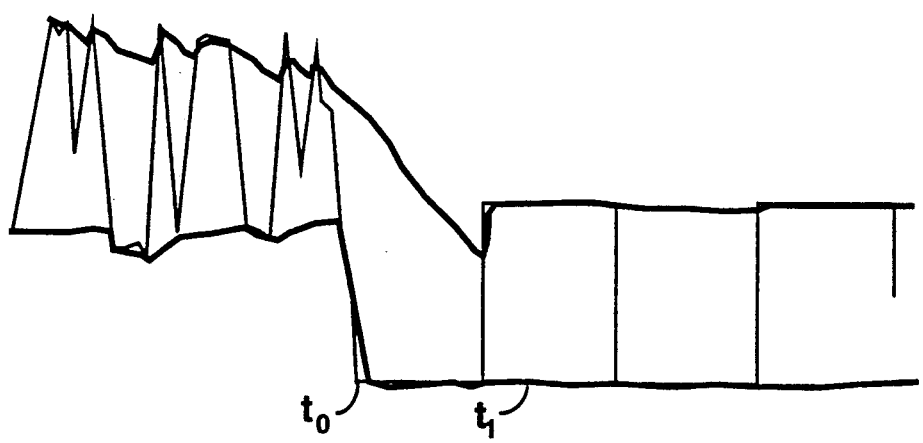
FIG. 3 is a signal diagram depicting the tracking of a received signal by the radio communication device of FIG. 1 in accordance with the preferred embodiment of the present invention.

Referring next to FIG. 3, a signal diagram illustrates the tracking of a demodulated signal in the radio communication device 100 in accordance with the preferred embodiment of the present invention. As described above, when the rate controller 185 determines that the signal is noisy, a signal is transmitted directing the peak/valley controller 120 to track the demodulated signal at a higher acquisition rate. In this manner, when, at $t_0$, the desired signal is received, the peaks and valleys are tracked and acquired at the beginning of the desired signal. As a result, none of the information included in the desired signal is missed by the radio communication device 100. Thereafter, at time $t_1$, the acquisition rate may be adjusted to a slower rate such that variations in the desired signal do not affect the peak and valley values provided to the threshold detector 150 for generation of data. In this manner, accurate generation and decoding of data, as well as prevention of missed data, is ensured.

Figure 4:
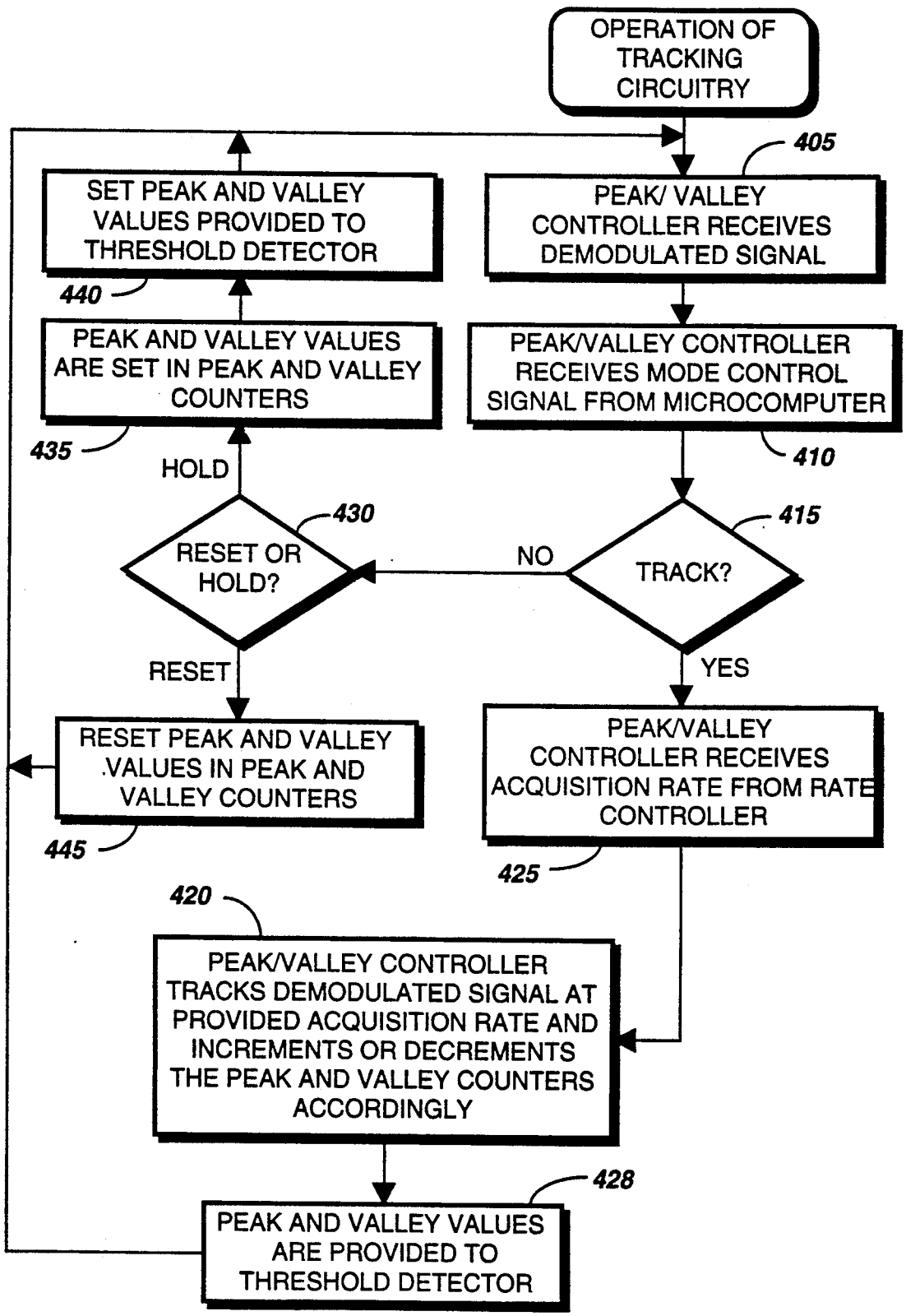
FIG. 4 is a flowchart depicting the operation of tracking circuitry included within the radio communication device of FIG. 1 in accordance with the preferred embodiment of the present invention.

With reference to FIG. 4, a flowchart depicts the operation of the tracking circuitry 115 (FIG. 1) in accordance with the preferred embodiment of the present invention. The initial step in the operation of the tracking circuitry 115 is the reception, at step 405, of the demodulated signal by the peak/valley controller 120. Additionally, the peak/valley controller 120 receives, at step 410, a mode control signal from the microcomputer CPU 140, as described above. When the mode control signal places, at step 415, the peak/valley controller 120 in the track mode, the demodulated signal is tracked, at step 420, at an acquisition rate determined by the rate controller 185 and provided, at step 425, to the peak/valley controller 120.

In accordance with the preferred embodiment of the present invention, the acquisition rate is determined by the number of center transitions of the demodulated signal. If the number of center transitions exceeds a predetermined noise threshold value provided by the CPU 140, the signal is determined to be noisy, and the acquisition rate is adjusted to a fast rate for the reasons set forth above. Conversely, if the number of center transitions is below the noise threshold value, the signal is determined to be a desired signal, and the acquisition rate is set such that the signal is tracked slowly, thereby preventing small variations in the signal from creating decoding errors.

As the signal is tracked, the peak/valley controller 120 increments and decrements, at step 420, the peak and valley counters 125, 130 (FIG. 1) to reflect the amplitude levels of the signal. The values stored in the peak and valley counters 125, 130 are thereafter, at step 428, provided to the threshold detector 150, which utilizes the peak and valley values as well as the demodulated signal to generate data. When the data is determined by the CPU 140 to be correct, the peak/valley controller 120 is set, at step 430, in a hold mode in which the peak and valley values stored in the peak and valley counters 125, 130 are set, at step 435. These set values are thereafter utilized, at step 440, by the threshold detector 150 to generate data that will not be influenced by noise spikes that could occur in the desired signal.

As described above, when the decoding process is complete, the CPU 140 sends a control signal via the mode control line 145, at step 430, to place the peak/valley controller 120 in the reset mode. In this mode, the peak/valley controller 120 resets, at step 445, the peak and valley values set in the counters 125, 130, subsequent to which the demodulated signal is again tracked at step 420.

In summary, the radio communication device as described above receives and demodulates a radio frequency signal, subsequent to which the demodulated signal is tracked to acquire the peaks and valleys of the signal. In accordance with the preferred embodiment of the present invention, the acquisition rate with which the peaks and valleys of the signal are acquired may be advantageously varied by the radio communication device in response to determining whether the received signal is noisy or not. When the received signal is determined to be noisy, the acquisition rate is adjusted such that the peaks and valleys of the signal may be tracked and acquired more quickly. Therefore, when the transition from a noisy signal to a desired signal occurs, the peaks and valleys may be acquired at a fast rate, thereby ensuring that the desired signal is received in its entirety. Once the desired signal is recognized, the acquisition rate is adjusted to track the signal more slowly. In this manner, variations, such as noise spikes, are prevented from significantly affecting the acquired peaks and valleys. As a result, the data generated from the signal and the peak and valley values remains as accurate as possible.

It may be appreciated by now that there has been provided a radio communication device having tracking circuitry which is able to rapidly acquire changing peak and valley values when necessary. Additionally, when a desired signal is received by the radio communication device, the tracking circuitry is able to acquire the peak and valley values at a slower rate to decrease data generation errors.

I claim:

1. A method, in a radio communication device for receiving a signal, for tracking the signal to acquire peak and valley values of the signal, the method comprising the steps of:
  (a) determining a center threshold of the signal;
  (b) determining a number of center transitions of the signal within a predetermined time period, wherein the number of center transitions is equivalent to the number of times the signal crosses the center threshold; and
  (c) adjusting, in response to step (b), an acquisition rate at which the peak and the valley values of the signal are acquired from a first acquisition rate to a second acquisition rate in accordance with the number of center transitions occurring in the predetermined time period.

2. The method in accordance with claim 1, wherein step (b) comprises the step of:
  (d) determining that the number of center transitions within the predetermined time period indicates that the signal is an undesired signal.

3. The method in accordance with claim 2, wherein step (c) comprises the step of:
  (e) adjusting, in response to step (d), the acquisition rate from the first acquisition rate to the second acquisition rate, wherein the second acquisition rate is faster than the first acquisition rate.

4. The method in accordance with claim 1, wherein step (b) comprises the step of:
  (f) determining that the number of center transitions within the predetermined time period indicates that the signal is a desired signal.

5. The method in accordance with claim 4, wherein step (c) comprises the step of:
  (g) adjusting, in response to step (f), the acquisition rate from the first acquisition rate to the second acquisition rate, wherein the second acquisition rate is slower than the first acquisition rate.

6. The method in accordance with claim 5, further comprising the steps of:
  (h) generating data from the desired signal; and
  (i) decoding the data generated from the desired signal.

7. A radio communication device for receiving a signal, comprising:
  tracking circuitry for tracking the signal to acquire peak and valley values of the signal;
  a threshold detector coupled to the tracking circuitry for determining a center threshold of the signal;
  an edge detector coupled to the threshold detector and the tracking circuitry for determining a number of center transitions of the signal in a predetermined time period, wherein the number of center transitions is equivalent to the number of times the signal crosses the center threshold; and
  a rate controller coupled to the edge detector and the tracking circuitry for receiving the number of center transitions and for adjusting an acquisition rate with which the peak and valley values are acquired in accordance with the number of center transitions.

8. The radio communication device in accordance with claim 7, wherein the rate controller, in response to determining that the number of center transitions indicates that the signal is an undesired signal, adjusts the acquisition rate from a first acquisition rate to a second acquisition rate, wherein the second acquisition rate is faster than the first acqusition rate.

9. The radio communication device in accordance with claim 7, wherein the rate controller, in response to determining that the number of center transitions indicates that the signal is a desired signal, adjusts the acquisition rate from a first acquisition rate to a second acquisition rate, wherein the second acquisition rate is slower than the first acquisition rate.

10. The radio communication device in accordance with claim 7, wherein the threshold detector further generates data in accordance with the signal and the peak and valley values of the signal.

11. The radio communication device in accordance with claim 10, further comprising a processing unit coupled to the threshold detector for decoding the data.

12. The radio communication device in accordance with claim 11, wherein the processing unit decodes the data to recover a selective call message included therein when the signal is determined to be a desired signal.

13. The radio communication device in accordance with claim 12, further comprising:
  a memory coupled to the processing unit for storing the selective call message; and
  a display device coupled to the processing unit for displaying the selective call message.

14. The radio communication device in accordance with claim 7, wherein the tracking circuitry comprises:
  a peak counter for storing the peak value;
  a valley counter for storing the valley value; and
  a peak/valley controller coupled to and controlling the peak and valley counters.

15. The radio communication device in accordance with claim 14, wherein the peak/valley controller increments and decrements the peak and valley counters in accordance with the signal.

16. The radio communication device in accordance with claim 15, wherein:
  the threshold detector further generates data in accordance with the signal and peak and valley values; and
  the radio communication device further comprises a processing unit coupled to the threshold detector and the peak/valley controller for receiving the data and generating in accordance therewith control signals provided to the peak/valley controller.

17. A radio communication device for receiving a signal, comprising:
  tracking circuitry for tracking the signal to acquire peak and valley values of the signal, the tracking circuitry comprising:
    a peak counter for storing the peak value;
    a valley counter for storing the valley value; and
    a peak/valley controller coupled to and controlling the peak and valley counters, wherein the peak/valley controller increments and decrements the peak and valley counters;
  a threshold detector coupled to the tracking circuitry for determining a center threshold of the signal and for generating data in accordance with the signal and the peak and valley values;
  an edge detector coupled to the threshold detector and the tracking circuitry for determining a number of center transitions of the signal in a predetermined time period, wherein the number of center transitions is equivalent to the number of times the signal crosses the center threshold;
  a rate controller coupled to the edge detector and the tracking circuitry for receiving the number of center transitions and for adjusting an acquisition rate with which the peak and valley values are acquired in accordance with the number of center transitions; and a processing unit coupled to the peak/valley controller and the threshold detector for receiving the data from the threshold detector and generating in accordance therewith control signals provided to the peak/valley controller and for decoding the data to recover information included therein.

18. The radio communication device in accordance with claim 17, wherein the rate controller, in response to determining that the number of center transitions indicates that the signal is an undesired signal, adjusts the acquisition rate from a first acquisition rate to a second acquisition rate, wherein the second acquisition rate is faster than the first acquisition rate.

19. The radio communication device in accordance with claim 17, wherein the rate controller, in response to determining that the number of center transitions indicates that the signal is a desired signal, adjusts the acquisition rate from a first acquisition rate to a second acquisition rate, wherein the second acquisition rate is slower than the first acquisition rate.

* * * * *